J. OTTI.
ANIMAL POKE.
APPLICATION FILED APR. 14, 1920.

1,364,797.

Patented Jan. 4, 1921.

Inventor
Joseph Otti
By Geo. F. Kimmel
Attorney

UNITED STATES PATENT OFFICE.

JOSEPH OTTI, OF OKLAHOMA, OKLAHOMA.

ANIMAL-POKE.

1,364,797. Specification of Letters Patent. Patented Jan. 4, 1921.

Application filed April 14, 1920. Serial No. 373,938.

*To all whom it may concern:*

Be it known that I, JOSEPH OTTI, a citizen of the United States, residing at Oklahoma city, in the county of Oklahoma and State of Oklahoma, have invented certain new and useful Improvements in an Animal-Poke, of which the following is a specification.

This invention relates to animal pokes, and has for one of its objects to improve the construction and increase the efficiency and utility of devices of this character.

Another object of the invention is to produce a device of this character which may be readily adapted to the necks of animals of various sizes without structural change or detaching any of the parts.

With these and other objects in view, the invention consists in the features of construction, combination and arrangement of parts as will be hereinafter fully described, illustrated in the accompanying drawing and pointed out in the claims appended hereunto.

Figure 1:
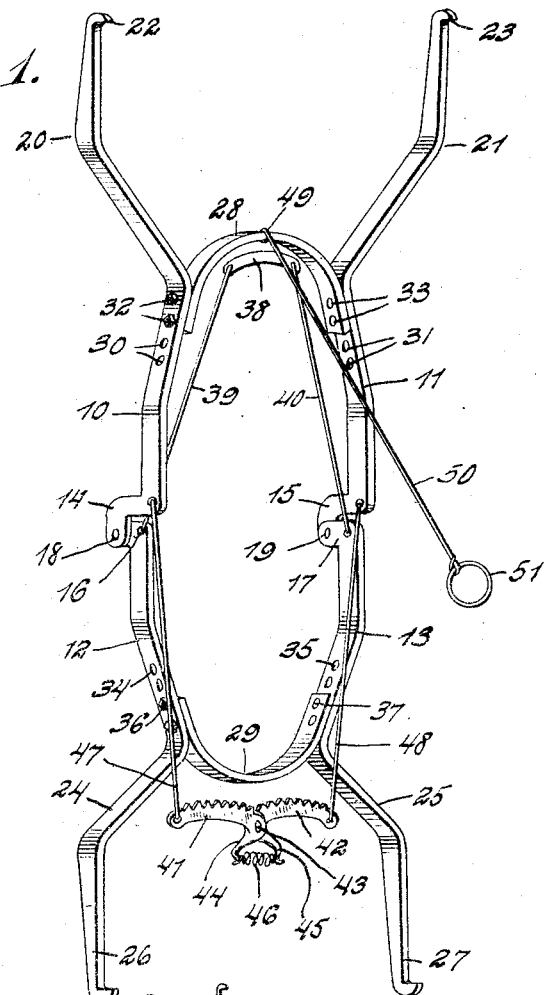
Figure 1 is a perspective view of the improved device.

The improved device comprises upper side members 10 and 11 and lower side members 12 and 13. The upper members 10 and 11 are offset rearwardly and thence directed downwardly at their lower ends as represented at 14 and 15, while the side members 12 and 13 are offset rearwardly as shown at 16 and 17.

The offsets 14 and 16 are pivotally united as shown at 18, while the offsets 15 and 17 are pivotally united as shown at 19.

The side portions 10 and 11 are bent outwardly and thence directed upwardly as shown at 20 and 21 and terminate in stop hooks 22 and 23, while the side members 12 and 13 are similarly formed, as shown at 24 and 25, and terminate in stop hooks 26 and 27.

Connecting the upper side members 10 and 11 at the juncture therewith of the portions 20 and 21 is an upwardly arched member 28, and similarly coupling the members 12 and 13 at the juncture therewith of the portions 24 and 25 is a downwardly arching member 29.

The members 10 and 11 are each provided with a plurality of apertures 30 and 31 to receive the clamp bolts 32 and 33, by which the arched member 27 is adjustably coupled to the side members 10 and 11, while the side members 12 and 13 are each provided with similar apertures 34 and 35 to receive the clamp bolts 36 and 37 by which the arched member 29 is adjustably coupled to the side members 12 and 13. The members 10, 11, 12, 13 and 28 and 29 constitute a band or yoke to engage around the neck of the animal, and by connecting the arched members adjustably to the side members, the device may be readily adapted to necks of varying size. The yoke is also narrowed as it is adjusted shorter and widened as it is adjusted longer, as will be obvious.

Figure 2:
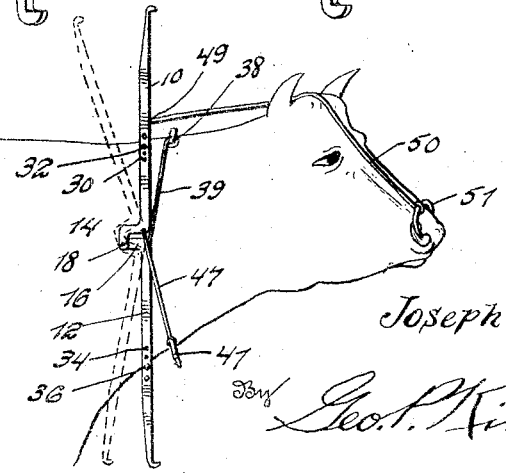
Fig. 2 is a side elevation of the improved device applied.

Disposed adjacent to the upper arched member 28 is a curved bearing plate 38 which is connected at the ends by flexible wires or cords 39 and 40 respectively to lower side members 12 and 13. The member 38 is designed to bear upon the neck of the animal in advance of the body of the yoke, as shown in Fig. 2.

Disposed adjacent to the arched member 29 is a two part throat engaging member 41 and 42 pivotally united at 43 and with their upper edges serrated or toothed, as shown.

The members 41 and 42 have downward extensions 44 and 45 connected by a spring 46 operating to yieldably support the member 41 and 42.

The members 41 and 42 are connected at their outer ends by flexible wires or cords 47 and 48 to the lower ends of the side members 10 and 11.

Attached at 49 to the arched member 28 is a flexible wire or cord 50 having a ring 51 at its free end adapted to be connected to the nose of the animal, as shown in Fig. 2.

With a device thus constructed and applied, the device hangs loosely on the animal's neck with the toothed members 41 and 42 held distended by the spring 46 and away from the throat. The presence of the device does not annoy or discommode the animal under ordinary conditions, or interfere with its feeding or moving about.

If, however, the animal attempts to thrust the head through a restricted passage way, for instance between the wires of a fence, the wires will be engaged by the hooked terminals of the members 10, 11 or 12, 13, or both, and cause the latter to swing rearwardly on the pivots 18 and 19 and thus draw upon the cords or wires and compress the member 38 upon the upper part of the neck, compress the teeth of the members 41 and 42 against the throat of the animal, and at the same time exert an upward pull upon the nose, and cause the animal to instantly move backward away from the fence in its effort to relieve itself of the pricking of the teeth, and the pull on the nose. The members 42 and 47 close up similar to a pair of scissors when pressure is applied, but do not cut through the hide of the animal.

As soon as the pressure is removed the parts automatically resume their former position, and cease to apply pressure or pulling force.

The pressure upon the neck and throat is greatly increased by reason of the great leverage produced by the relatively short offsets and the relatively great distance between the offsets and the hooked terminals, thus materially increasing the pressure, and the harder the animal presses against the obstruction the greater will be the pressure against its neck and the pulling force upon the nose.

The device is constructed wholly of metal and the pull members will preferably be of flexible wire.

The preferred embodiment of the invention is disclosed in the drawings and set forth in the specifications, but it will be understood that any modifications within the scope of the claims may be made in the construction without departing from the principle of the invention or sacrificing any of its advantages.

I claim:

1. An animal poke comprising upper and lower body members adapted to encompass the neck of an animal and with upwardly and downwardly directed extensions, said upper and lower members having rearwardly directed offsets pivotally united at their confronting ends, a member adapted to bear upon the neck of the animal, a member adapted to bear beneath the throat of the animal, means for connecting said neck engaging member with the lower body member, and means for connecting the throat engaging member with the upper body members.

2. An animal poke comprising upper and lower body members adapted to encompass the neck of an animal and with upwardly and downwardly directed extensions, said upper and lower members having rearwardly directed offsets pivotally united at their confronting ends, a member adapted to bear upon the neck of the animal, a member adapted to bear beneath the throat of the animal, means for connecting said neck engaging member with the lower body member, means for connecting the throat engaging member with the upper body members, and pull members connected to the upper body member and adapted to be engaged with the nose of the animal.

3. An animal poke comprising upper and lower body portions each including spaced sides adjustably coupled intermediate the ends, said sides having rearwardly directed offsets pivotally united and forming a neck encompassing yoke, a member adapted to bear upon the neck of the animal, a member adapted to bear beneath the throat of the animal, means for connecting said neck engaging member with the lower body portions, and means for connecting the throat engaging member with the upper body portions.

4. An animal poke comprising upper and lower body portions each including spaced sides adjustably coupled intermediate the ends, said sides having rearwardly directed offsets pivotally united and forming a neck encompassing yoke, a member adapted to bear upon the neck of the animal, a member adapted to bear beneath the throat of the animal, means for connecting said neck engaging member with the lower body portion, means for connecting the throat engaging member with the upper body portion, and a pull member connected to the upper body portion and adapted to be engaged with the nose of the animal.

5. An animal poke comprising upper and lower body members adapted to encompass the neck of the animal and with upwardly and downwardly directed extensions, said upper and lower members having rearwardly directed offsets pivotally united at their confronting ends, a member adapted to bear upon the neck of the animal, a member adapted to bear beneath the throat of the animal and formed of coacting members pivotally united and having upwardly directed teeth, means for connecting said neck engaging member with the lower body member, and means for connecting said toothed throat engaging members with the upper body members.

6. An animal poke comprising upper and lower body members adapted to encompass the neck of the animal and with upwardly and downwardly directed extensions, said upper and lower members having rearwardly directed offsets pivotally united at their confronting ends, a member adapted to bear upon the neck of the animal, a member adapted to bear beneath the throat of the animal and formed of coacting members pivotally united and having upwardly directed teeth, means for connecting said neck engaging member with the lower body member, means for connecting said toothed throat engaging members with the upper body member and a pull member connected to the upper body member and adapted to be engaged with the nose of the animal.

JOSEPH OTTI.